(12) United States Patent
Odom

(10) Patent No.: US 11,981,173 B1
(45) Date of Patent: May 14, 2024

(54) ANTI-THEFT TRAILER HITCH LOCK FOR TRAILER ATTACHED TO TOWING VEHICLE

(71) Applicant: James Milton Odom, Tulsa, OK (US)

(72) Inventor: James Milton Odom, Tulsa, OK (US)

(*) Notice: Subject to any disclaimer, the term of this patent is extended or adjusted under 35 U.S.C. 154(b) by 0 days.

(21) Appl. No.: 18/329,868

(22) Filed: Jun. 6, 2023

(51) Int. Cl.
*B60D 1/60* (2006.01)
*B60D 1/28* (2006.01)

(52) U.S. Cl.
CPC . *B60D 1/60* (2013.01); *B60D 1/28* (2013.01)

(58) Field of Classification Search
CPC . B60D 1/28; B60D 1/58; B60D 1/583; B60D 1/60; B60D 1/605
See application file for complete search history.

(56) References Cited

U.S. PATENT DOCUMENTS

| | | | | |
|---|---|---|---|---|
| 4,032,171 A * | 6/1977 | Allen | ................ | B60D 1/28 280/507 |
| 4,141,569 A | 2/1979 | Dilk | | |
| 4,538,827 A * | 9/1985 | Plifka | ................ | B60D 1/60 70/57 |
| 4,577,884 A * | 3/1986 | Harris | ................ | B60D 1/583 70/237 |
| 5,322,316 A | 6/1994 | Wheeler | | |
| 5,378,008 A * | 1/1995 | McCrossen | ................ | B60D 1/60 280/507 |
| 5,421,601 A * | 6/1995 | Hinze | ................ | B60D 1/60 280/507 |
| 5,681,053 A | 10/1997 | Misukanis et al. | | |
| 5,700,024 A * | 12/1997 | Upchurch | ................ | B60D 1/60 280/507 |
| 5,775,139 A | 7/1998 | Sellers | | |
| 6,606,887 B1 * | 8/2003 | Zimmer | ................ | E05B 73/0082 70/164 |
| 6,626,016 B2 * | 9/2003 | Nilges | ................ | B62D 53/085 70/58 |
| 6,758,624 B2 * | 7/2004 | Thompson | ................ | B60D 1/01 403/111 |
| 6,938,912 B1 * | 9/2005 | Norton | ................ | B60D 1/605 280/507 |
| 6,971,663 B1 * | 12/2005 | Blake | ................ | B60D 1/60 280/155 |
| 7,017,935 B1 * | 3/2006 | Bonfanti | ................ | B60D 1/065 280/491.5 |
| 7,635,143 B2 * | 12/2009 | Pappalardo | ................ | B60D 1/065 280/507 |

(Continued)

OTHER PUBLICATIONS

Brightway, Security Trailer Hitch Coupling lock Tow Ball Lock, retrieved from Internet, retrieved on Jun. 6, 2023, <URL:https://www.alibaba.com/product-detail/Security-Trailer-Hitch-Coupling-lock-Tow_60801086558.html>.

*Primary Examiner* — Kevin Hurley

(57) ABSTRACT

A hitch lock for securing a trailer attachment during to a towing vehicle. The hitch lock comprises two substantially symmetrically mirrored upside-down L-shaped brackets and a rectangular plate comprising downwardly angled ends. The brackets form an enclosed U-shape, covering the hitch ball when assembled, while the plate fits into multiple slots on the brackets, forming a locked position. The adjustable slots on the brackets facilitate accommodation of diverse trailer hitch configurations, ensuring a precise fit. The angled ends of the plate enhance stability, mitigating lateral movement and prevent unauthorized individuals from sliding the brackets off of the plate.

18 Claims, 10 Drawing Sheets

(56) References Cited

U.S. PATENT DOCUMENTS

| | | | |
|---|---|---|---|
| 8,556,288 B1* | 10/2013 | Bale | B60D 1/60 |
| | | | 280/507 |
| 9,033,358 B1* | 5/2015 | Williamson | B60D 1/06 |
| | | | 280/507 |
| 9,731,570 B1* | 8/2017 | Rodriguez | B60D 1/06 |
| 9,855,804 B1* | 1/2018 | Kirkconnell | B60D 1/28 |
| 10,017,019 B1* | 7/2018 | Ludwig | B60S 9/04 |
| 10,471,786 B1* | 11/2019 | McPhee | B60D 1/155 |
| 10,513,159 B2* | 12/2019 | Odom | B60D 1/60 |
| 10,766,321 B2* | 9/2020 | Pratt | B60D 1/28 |
| 11,292,305 B2* | 4/2022 | Strickland | B60D 1/06 |
| 11,458,787 B2* | 10/2022 | Schreier | B60D 1/06 |
| 11,535,072 B2* | 12/2022 | Williamson | B60D 1/06 |
| 2003/0189313 A1* | 10/2003 | Sievers | B60D 1/605 |
| | | | 280/507 |
| 2008/0067783 A1* | 3/2008 | Rousseau | B60D 1/60 |
| | | | 280/507 |
| 2009/0322061 A1* | 12/2009 | Rodriguez | B60D 1/605 |
| | | | 280/507 |
| 2011/0048083 A1* | 3/2011 | Adolph | E05B 67/36 |
| | | | 70/58 |
| 2012/0012588 A1* | 1/2012 | Shield | E05B 47/026 |
| | | | 220/315 |
| 2017/0313145 A1 | 11/2017 | McDougal | |
| 2022/0402317 A1 | 12/2022 | Lee, Jr. et al. | |
| 2023/0010432 A1* | 1/2023 | Summerfield | B60D 1/60 |

\* cited by examiner

ANTI-THEFT TRAILER HITCH LOCK FOR TRAILER ATTACHED TO TOWING VEHICLE

FIELD OF THE INVENTION

The present invention relates generally to a security means for preventing theft of a trailer. More specifically, the present invention is a trailer hitch lock that prevents the unauthorized removal of a trailer from the hitch of a towing vehicle.

BACKGROUND OF THE INVENTION

Hitch locks are crucial in preventing accidental detachment or theft of trailers, safeguarding both the trailer and the towing vehicle. Existing hitch lock designs have various limitations, such as complexity, difficulty of use, and insufficient security measures. Hitch locks play a crucial role in ensuring the safe and secure attachment of trailers to hitches during towing. They provide peace of mind to vehicle owners by preventing accidental detachment and deterring theft. Within the prior art, various types of hitch locks have been developed, each with their own advantages and limitations. Traditional hitch lock designs typically consist of components such as coupler locks, receiver locks, and pin locks. Coupler locks are commonly used to secure the trailer coupler onto the hitch ball. They are designed to prevent the coupler from accidentally disengaging from the hitch ball while the vehicle is in motion. These locks often employ mechanisms such as sliding bars, latches, or ball detents to achieve a secure connection. Receiver locks, on the other hand, are used to secure the trailer hitch receiver to the towing vehicle's hitch receiver. They typically employ pins or locking mechanisms to prevent the receiver from being separated from the vehicle's hitch. Pin locks are utilized to secure the hitch pin in place, preventing the trailer from becoming detached from the vehicle during travel. Within the prior art, there is an abundance of hitch locks that provide a security means to a trailer that is independent from the towing vehicle, however the present invention is seeking to provide a means of security to prevent theft of trailers coupled to the hitch of the towing vehicle.

An objective of the present invention is to provide an improved hitch lock system that addresses the limitations of existing designs. The present invention introduces a novel configuration comprising three components including two symmetrically mirrored upside-down L-shaped brackets and a rectangular plate with angled portions at each end. These components work in conjunction to form a robust and reliable mechanism for securing the trailer to the hitch ball while coupled to a towing vehicle. The L-shaped brackets are designed to fit over the hitch ball, forming an upside-down U-shape that encloses and protects the hitch ball. Multiple slots are incorporated into each bracket to allow for vertical adjustment, accommodating various trailer hitch configurations. The rectangular plate, with its downwardly bent portions at each end, provides an additional means of security as the design prevents those unauthorized from removing the lock from simply sliding the brackets off of the plate. The plate features a centrally located hole through which the hitch ball assembly passes through. The angled ends of the plate are designed to fit into the slots on the L-shaped brackets, creating a secure and locked position. This innovative combination of components enables users to achieve a snug and secure fit, specific to their hitch setup, while minimizing the risk of accidental detachment or theft. The design offers simplicity and ease of use, allowing users to install and remove the hitch lock quickly without the need for additional tools or complex procedures.

SUMMARY OF THE INVENTION

The hitch lock described herein comprises three primary components: two symmetrically mirrored upside-down L-shaped brackets and a rectangular plate with angled ends. These components work together to form a robust and reliable mechanism for securing a trailer to a hitch ball during towing.

The first components of the hitch lock are two upside-down L-shaped brackets. Each bracket is relatively symmetrical and forms the sides of an upside-down U-shape bracket when assembled. The brackets are designed to fit over the hitch ball, enclosing it securely and preventing unauthorized individuals from tampering with the hitch. Multiple slots are present on each bracket, allowing for lateral adjustment and accommodating various trailer hitch configurations. The second component of the hitch lock is the rectangular plate. This plate is equipped with ends bent downward at a 60-degree angle, providing stability and structural integrity. The plate features a central hole through which the hitch ball assembly passes. The angled ends of the plate fit into the slots on the L-shaped brackets, creating a secure and locked position.

When the hitch lock is in use, the L-shaped brackets are positioned over the hitch ball, encasing it within the upside-down U-shape. The rectangular plate is then aligned with the brackets, with the angled ends fitting into the appropriate slots. By adjusting the position of the plate within the slots, users can achieve a snug and secure fit specific to their hitch setup. The design of this hitch lock provides several advantages including simplicity, making it easy for users to install and remove the lock quickly without requiring additional tools or complex procedures. The multiple slots on the L-shaped brackets allow for flexibility in accommodating different hitch ball sizes and configurations. The angled ends of the rectangular plate enhance stability, preventing lateral movement and ensuring a safe connection between the brackets.

DETAIL DESCRIPTIONS OF THE INVENTION

Figure 1:
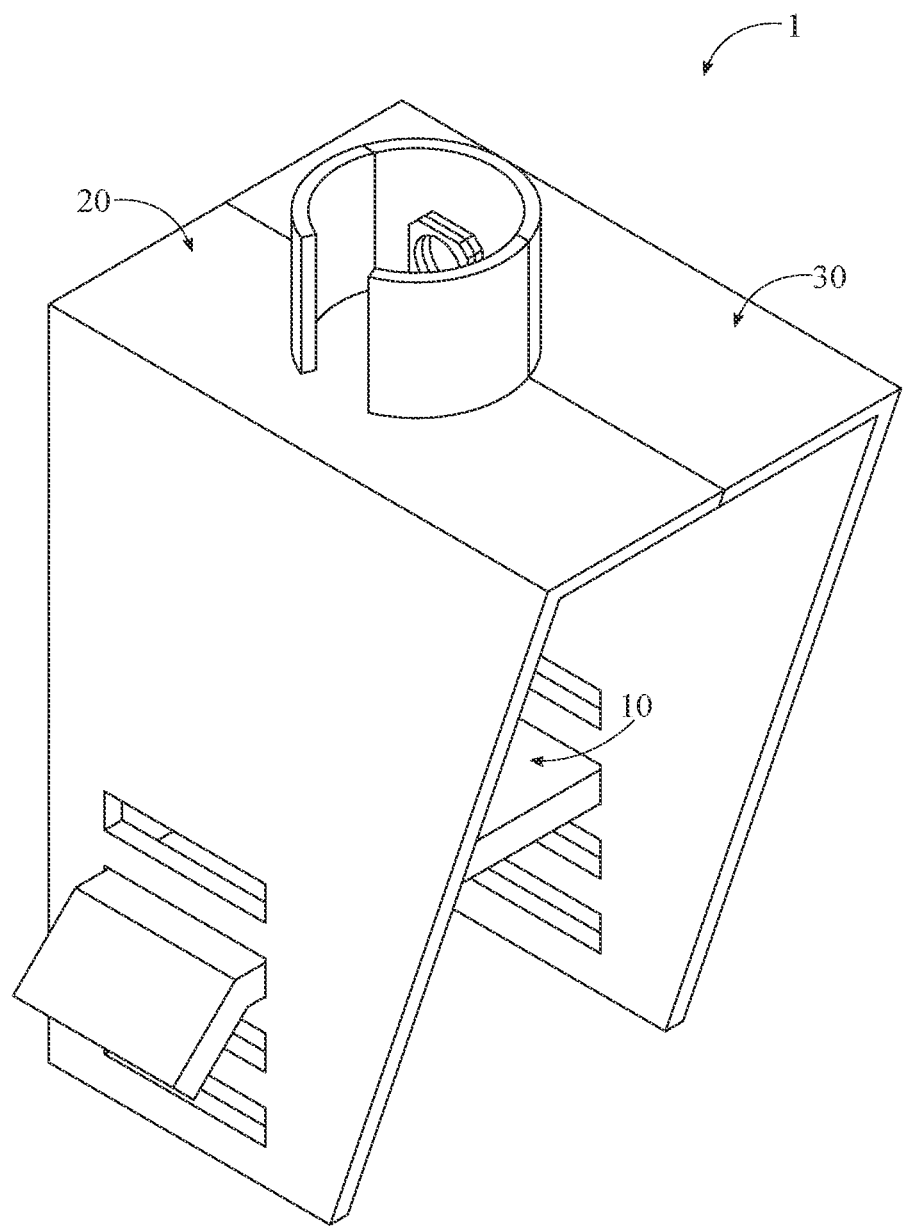
FIG. 1 is a perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a hitch lock 1, embodiments of the present disclosure are not limited to use only in this context.

Figure 2:
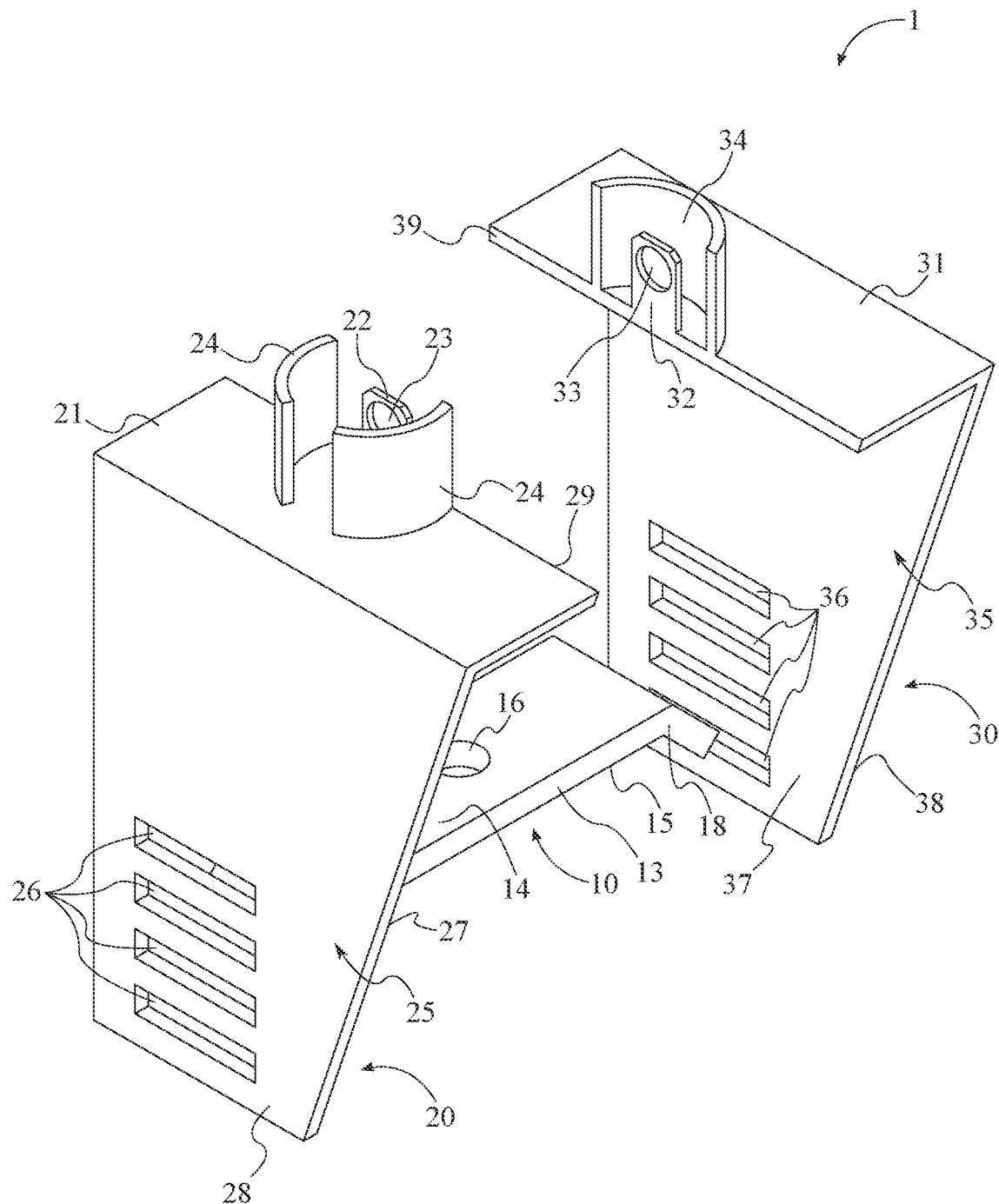
FIG. 2 is an exploded perspective view of the present invention.

The present invention, as shown in FIG. 1 and FIG. 2, is a hitch lock 1 comprising of a receiver plate 10 and two brackets, a first bracket 20 and a second bracket 30. The first bracket 20, like the second bracket 30, is an L-shaped bracket, wherein the first bracket 20 and the second bracket 30 are substantially mirrored images of one another. In the case of the present invention, the use of "substantially mirrored images of one another" is intended to mean that the components described herein are symmetrical in relation to the plane in which the first bracket 20 and the second bracket 30 interact. In the preferred embodiment of the present invention, the two L-shaped brackets are configured in a way whereby in the assembled configuration, the two brackets of the present invention form a downwardly facing U-shaped assembly. The receiver plate 10 is then interposed between the two brackets, protruding past the outermost bounds of the brackets.

Figure 3:
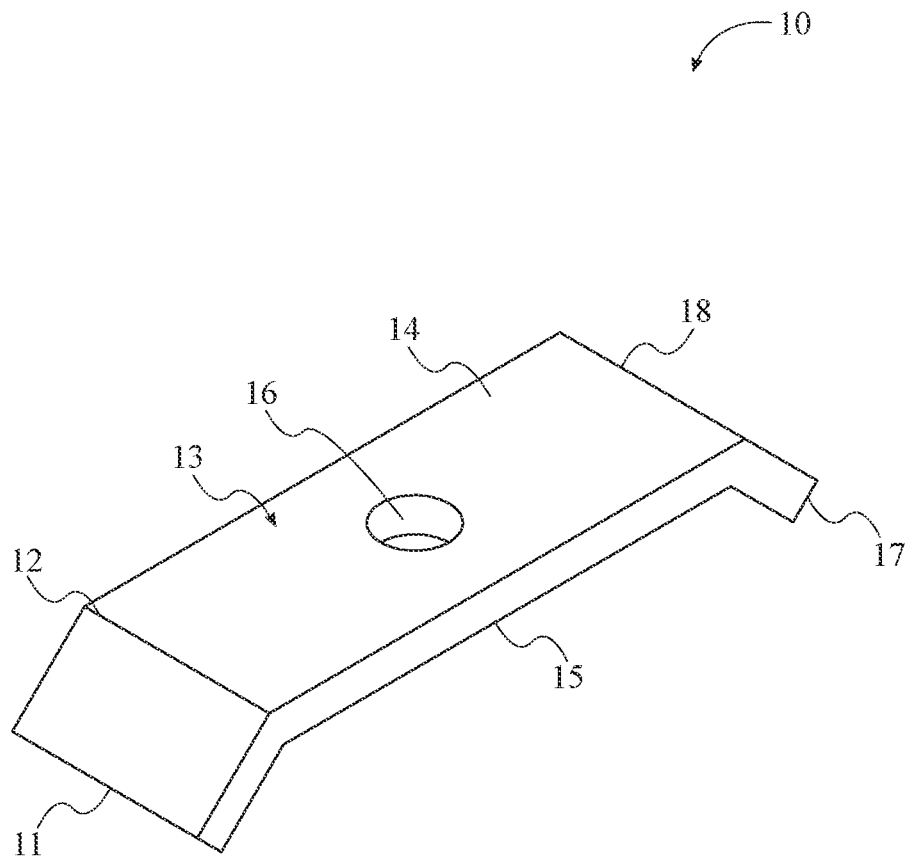
FIG. 3 is a perspective view of the receiver plate of the present invention.

As shown in FIG. 3, the receiver plate 10 is a rectangular plate comprising a first end 11, a horizontal portion 13, and a second end 17. The first end 11 is opposite the second end 17, wherein the horizontal portion 13 is the portion of the receiver plate 10 that remains horizontally level when in the preferred embodiment of the present invention. Further, in the preferred embodiment of the present invention, the first end 11 is angled downward, thus comprising a first angle 12 at the location where the horizontal portion 13 intersects with the first end 11 or the receiver plate 10. Likewise, in the preferred embodiment of the present invention, the second end 17 is angled downward, thus comprising a second angle 18 at the location where the horizontal portion 13 intersects with the second end 17 of the receiver plate 10. The horizontal portion 13 of the receiver plate 10 comprises a top face 14, a bottom face 15, and a through hole 16. In the preferred embodiment of the present invention, the through hole 16 is located approximately centered of the horizontal portion 13. The top face 14 and the bottom face 15 are two parallel horizontal planes, the top face 14 being the face of the horizontal portion 13 that is upwardly facing, whereas the bottom face 15 opposes the top face 14, facing downward.

Figure 4:
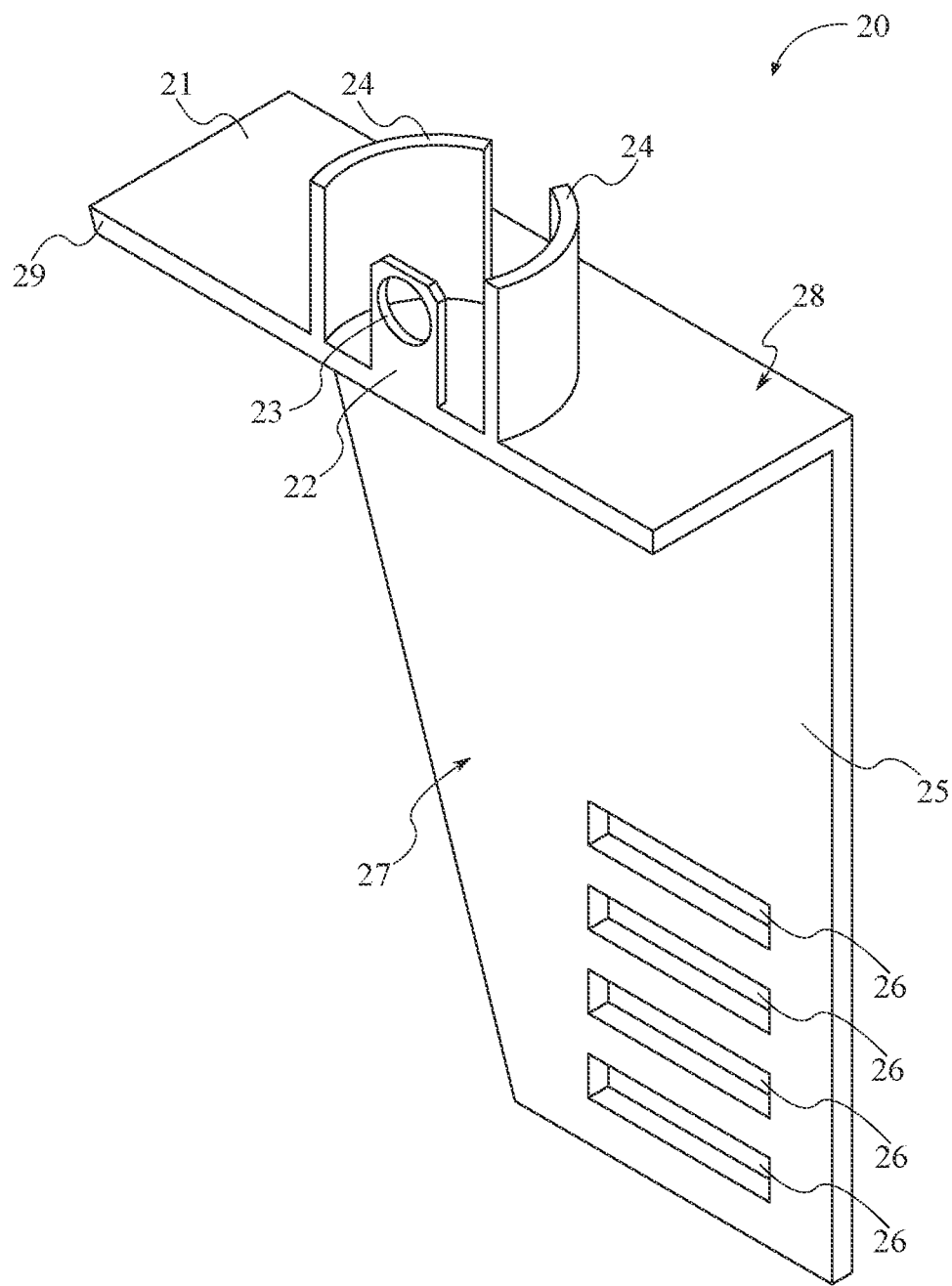
FIG. 4 is a perspective view of the first bracket of the present invention.

The first bracket 20, as shown in FIG. 4, is an L-shaped bracket comprising a horizontal plate 21 and a vertical plate 25. The horizontal plate 21 forming the uppermost horizontal body of the bracket, wherein the vertical plate 25 extends perpendicularly downwardly from the horizontal plate 21. The first bracket 20 comprises an interior surface 27 and an exterior surface 28. In the preferred embodiment of the present invention, the exterior surface 28 is the outwardly facing surface of the L-shaped bracket. Contrarily, the interior surface 27 is the surface of the bracket opposing the exterior surface 28, facing inward.

As shown in FIG. 4, the horizontal plate 21 of the first bracket 20 comprises a mating face 29. In the preferred embodiment, the mating face 29 is the face of the first bracket 20 that contacts the second bracket 30. Furthermore, the horizontal plate 21 of the first bracket 20 comprises a hasp 22 and a lock housing 24. The hasp 22 of the first bracket 20 is a tab perpendicularly protruding from the exterior surface 28 of the horizontal plate 21 of the first bracket 20, comprising a through hole 23. The lock housing 24, in the case of the present invention, is a protrusion that surrounds at least a portion of the hasp 22, as shown in FIG. 4. Furthermore, the vertical plate 25 of the first bracket 20 comprises a plurality of slots 26 whereby the slots 26 are parallel to one another and are positioned proximate a lower portion of the vertical plate 25.

Figure 5:
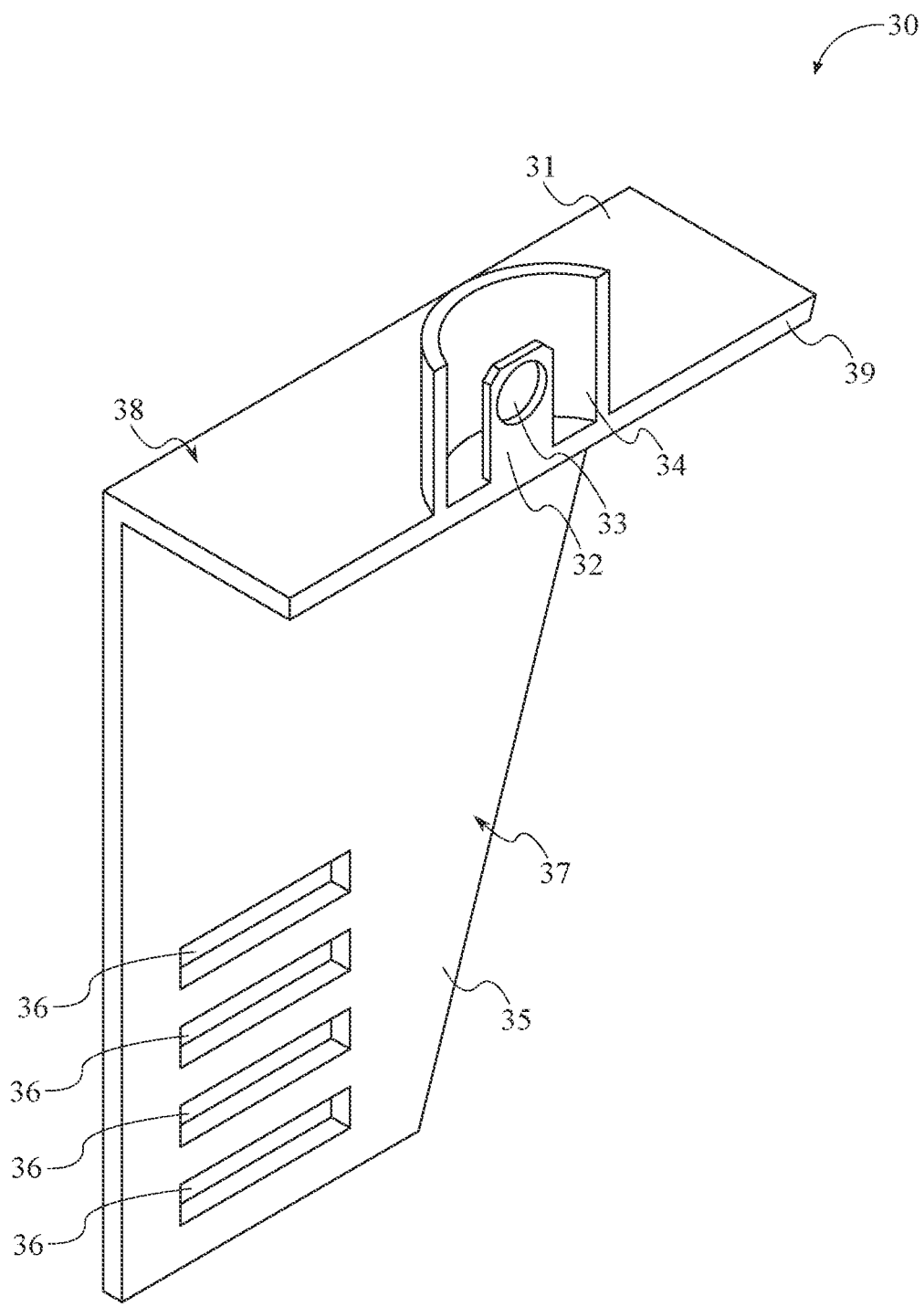
FIG. 5 is a perspective view of the second bracket of the present invention.

The second bracket 30, as shown in FIG. 5, is an L-shaped bracket, mirroring the first bracket 20, comprising a horizontal plate 31 and a vertical plate 35. The horizontal plate 31 of the second bracket 30 forms the uppermost horizontal body of the second bracket 30, wherein the vertical plate 35 extends perpendicularly downwardly from the horizontal plate 31. The second bracket 30 comprises an interior surface 37 and an exterior surface 38. In the preferred embodiment of the present invention, the exterior surface 38 is the outwardly facing surface of the L-shaped second bracket 30. Contrarily, the interior surface 37 is the surface of the second bracket 30 opposing the exterior surface 38, facing inward.

Figure 6:
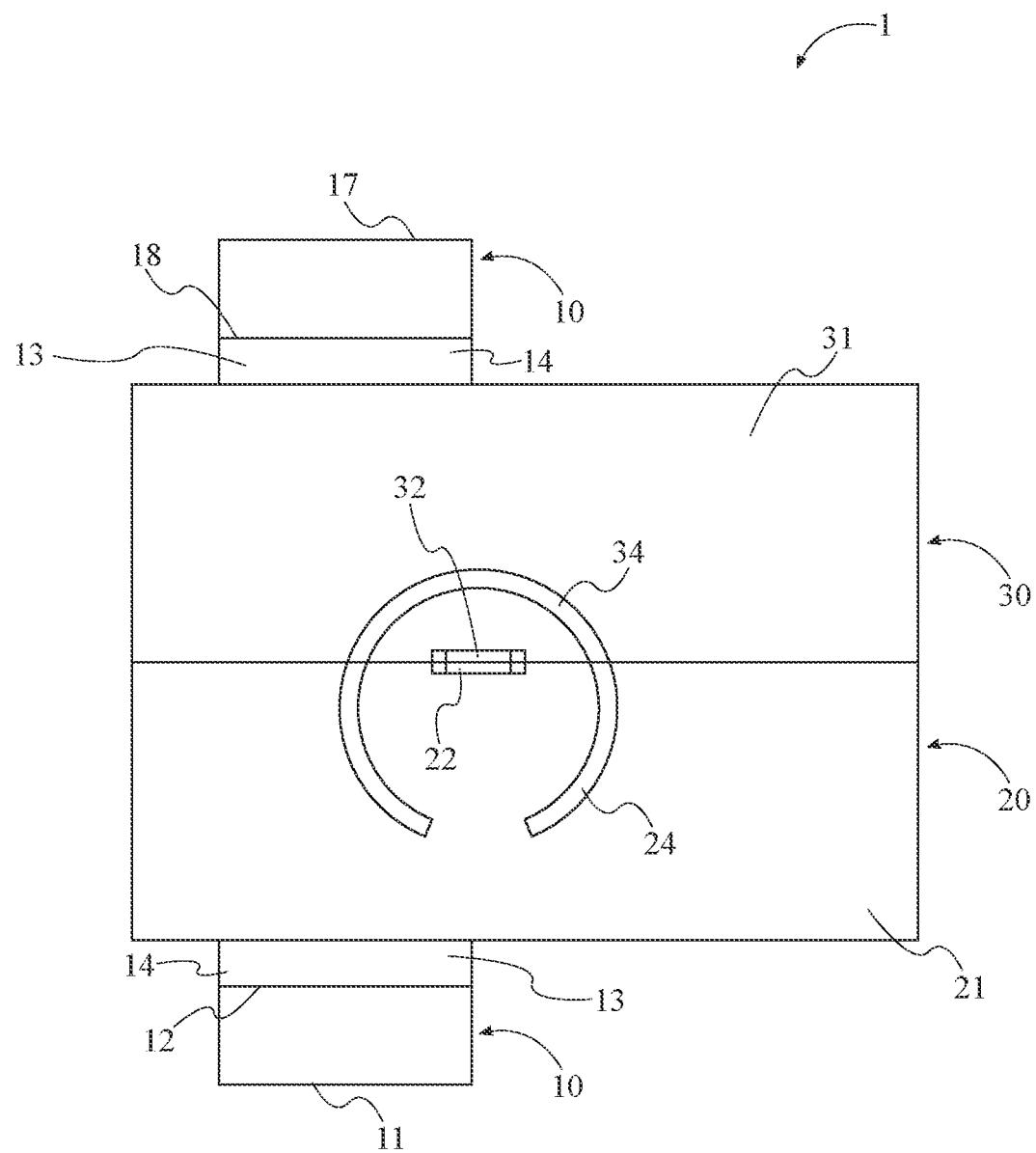
FIG. 6 is a top elevated view of the present invention.

As shown in FIG. 5, the horizontal plate 31 of the second bracket 30 comprises a mating face 39. In the preferred embodiment, the mating face 39 is the face of the second bracket 30 that contacts the mating face 29 of the first bracket 20. Furthermore, the horizontal plate 31 of the second bracket 30 comprises a hasp 32 and a lock housing 34. The hasp 32 of the second bracket 30 is a tab perpendicularly protruding from the exterior surface 38 of the horizontal plate 31 of the second bracket 30, comprising a through hole 33. The lock housing 34, in the case of the present invention, is a protrusion that surrounds at least a portion of the hasp 32, as shown in FIG. 5. Furthermore, the vertical plate 35 of the second bracket 30 comprises a plurality of slots 36 whereby the slots 36 are parallel to one another and are positioned proximate a lower portion of the vertical plate 35. When in the assembled configuration, the plurality of slots 26 of the first bracket 20 aligns with the plurality of slots 36 of the second bracket 30, in the preferred embodiment of the present invention. Additionally, the through hole 23 of the hasp 22 of the first bracket 20, when assembled, aligns with the through hole 33 of the hasp 32 of the second bracket 30, as shown in FIG. 6. In the preferred embodiment, the users of the hitch lock 1 may use a locking mechanism to secure the first bracket 20 and the second bracket 30 together. In the preferred embodiment, the locking mechanism is a puck lock, although this should not be limited to such and may include a combination lock, a padlock, or the like.

Figure 7:
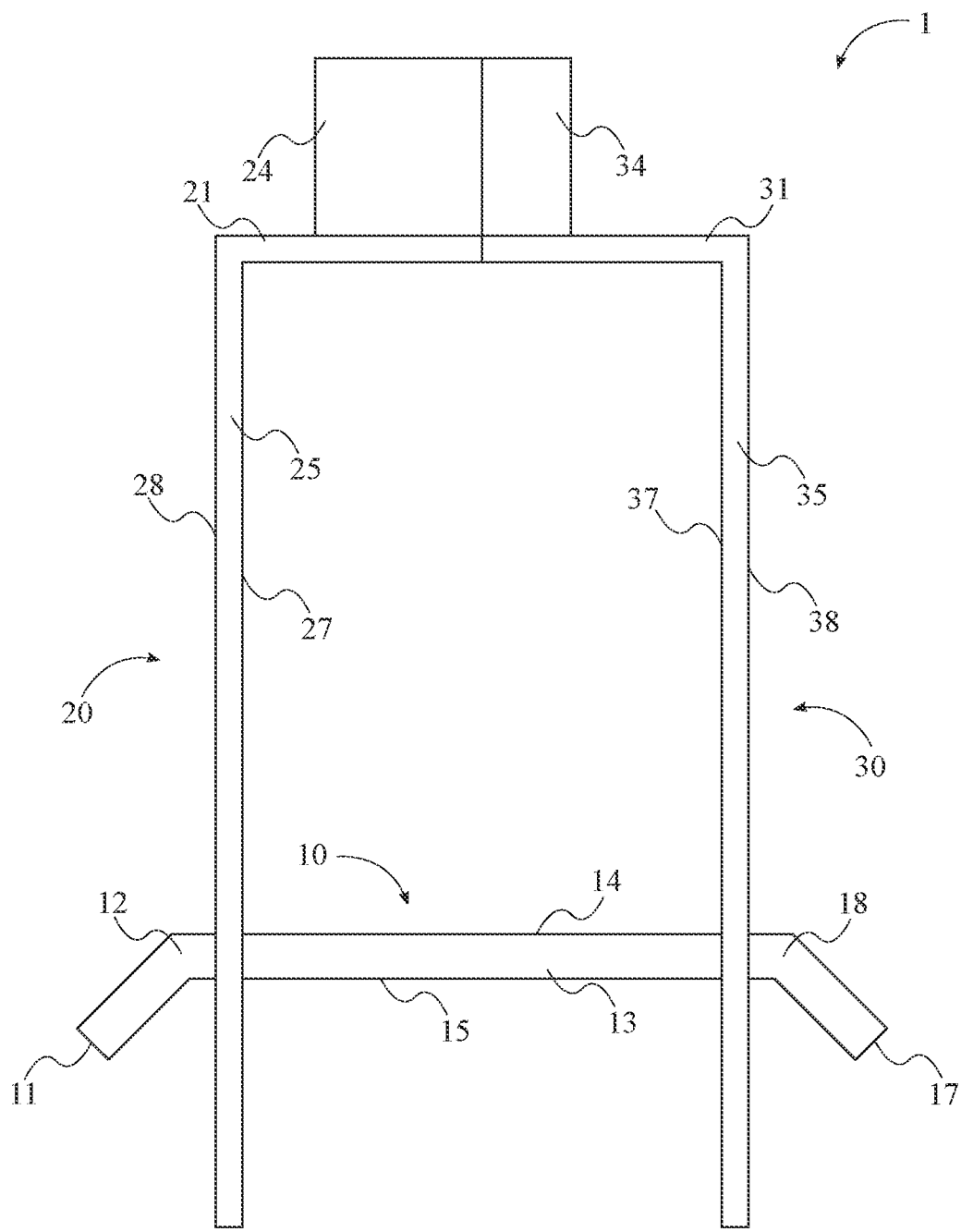
FIG. 7 is a front view of the present invention.
Figure 8:
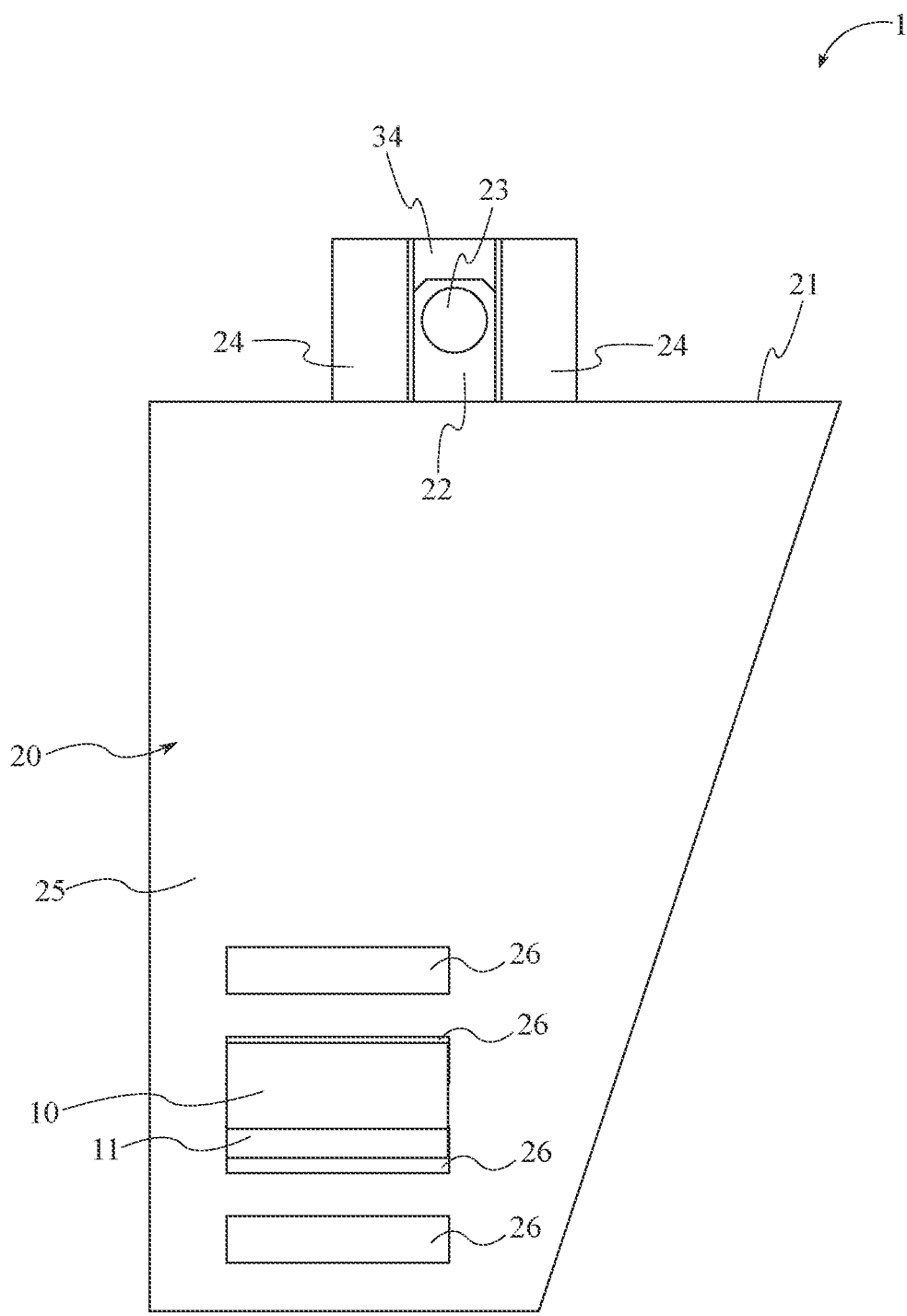
FIG. 8 is a side view of the present invention.
Figure 9:
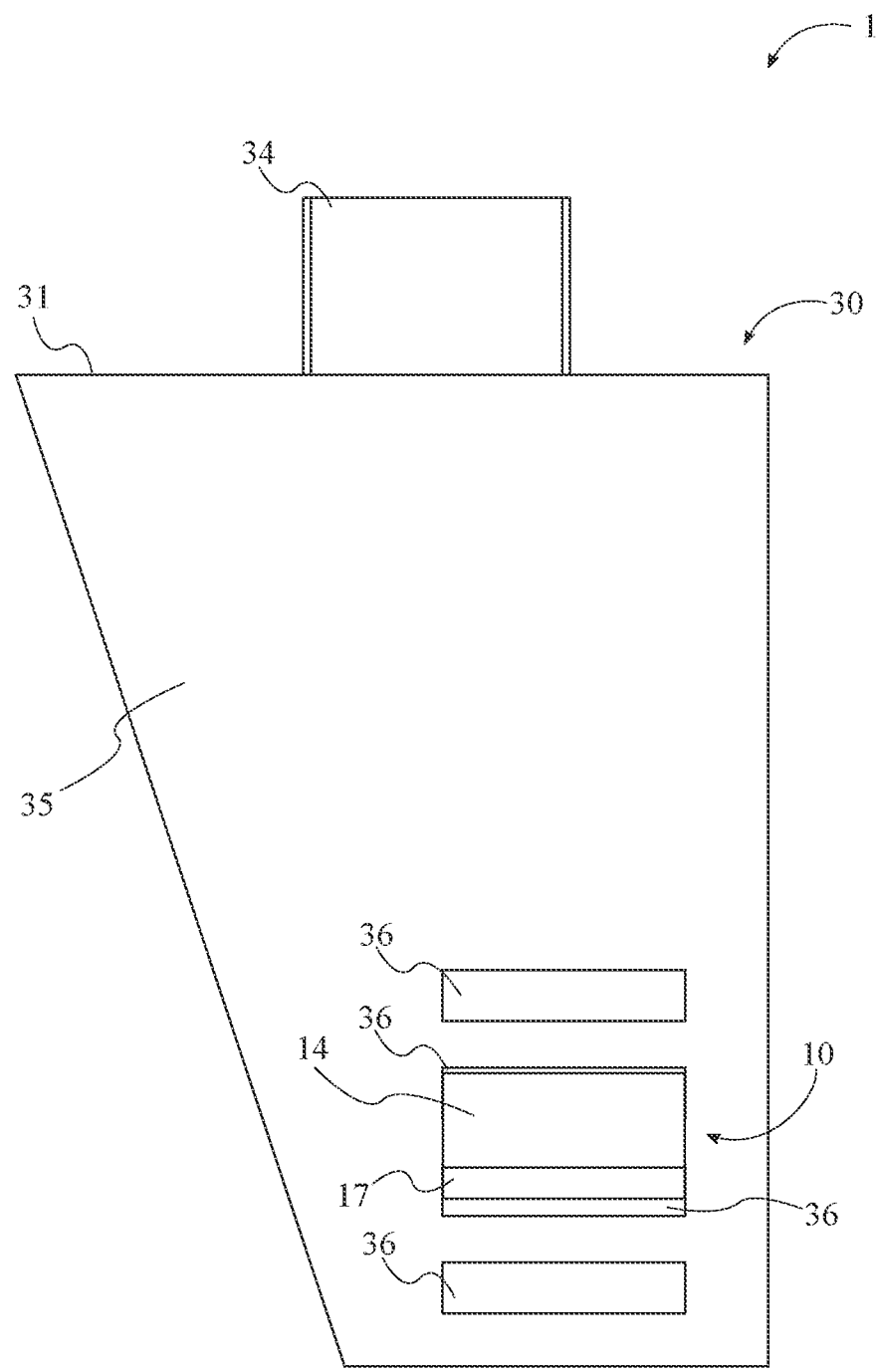
FIG. 9 is an alternate side view of the present invention.

In the assembled configuration, as shown in FIG. 7, FIG. 8, and FIG. 9, the two ends of the receiver plate 10, the first end 11 and the second end 17, fit within one of the slots 26 of the first bracket 20 and one of the slots 36 of the second bracket 30, protruding past the exterior surface 28 of the vertical plate 25 of the first bracket 20 and the exterior surface 38 of the vertical plate 35 of the second bracket 30, respectively.

Figure 10:
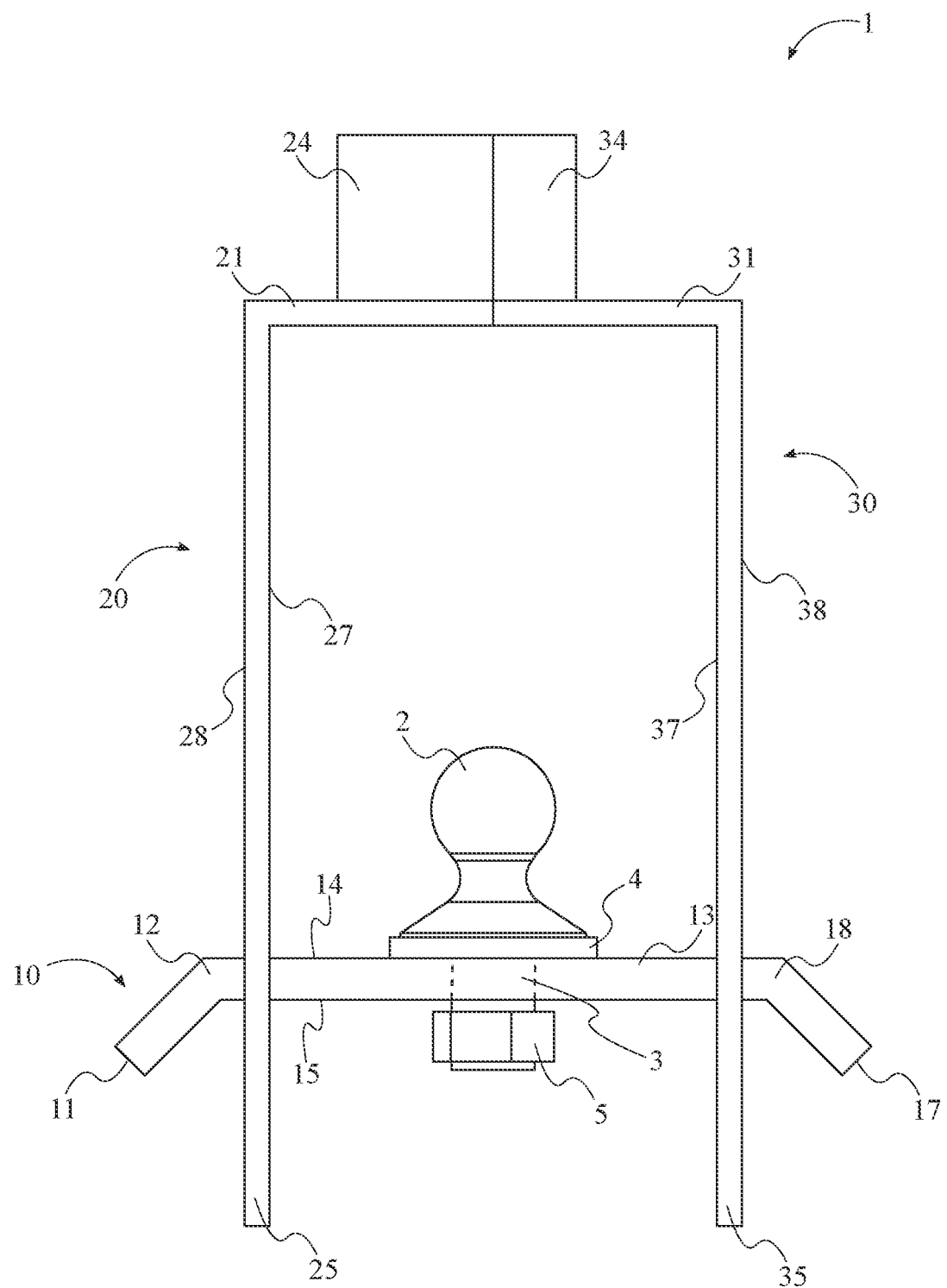
FIG. 10 is a front view of the present invention coupled to a hitch assembly.

As shown in FIG. 10, in the preferred embodiment of the present invention, the assembled configuration of the hitch lock 1 attaches to a hitch assembly of a towing vehicle and the respective hitched trailer, comprising a hitch ball 2, a hitch ball shaft 3, a hitch receiver tongue 4, and a hitch shaft fastener 5. The hitch ball shaft 3 may be a bolt, wherein the hitch shaft fastener 5 may be a nut coupled to said bolt. The hitch ball 2 is attached to the hitch receiver tongue 4 via the hitch shaft 3. In the preferred embodiment of the present invention, the top face 14 of the horizontal portion 13 of the receiver plate 10, engages with the hitch receiver tongue 4. In the aforementioned preferred embodiment, the hitch ball shaft 3 traverses through the through hole 16 of the receiver plate 10 and the hitch ball 2 protrudes into an interior chamber formed by the present invention. In the preferred embodiment, the hitch ball 2, is concealed from view and contained within the present invention.

Although the invention has been explained in relation to its preferred embodiment, it is to be understood that many other possible modifications and variations can be made without departing from the spirit and scope of the invention.

What is claimed is:

1. A hitch lock comprising a first bracket, a second bracket, and a receiver plate, wherein each bracket is an L-shaped bracket;

the first bracket comprising a horizontal plate perpendicularly joined to a vertical plate extending downwardly from said horizontal plate;

the first bracket further comprising an interior surface and an exterior surface, wherein the exterior surface is the outwardly facing surface of the first bracket and the interior surface is the opposing surface of the first bracket;

the second bracket comprising a horizontal plate perpendicularly joined to a vertical plate extending downwardly from said horizontal plate;

the second bracket further comprising an interior surface and an exterior surface, wherein the exterior surface is the outwardly facing surface of the second bracket and the interior surface is the opposing surface of the second bracket;

the receiver plate being a rectangular plate comprising a first end and a second end, wherein the first end is angled downward;

the horizontal plate of the first bracket comprises a mating face;

the horizontal plate of the second bracket comprises a mating face;

the mating face of the first bracket and the mating face of the second bracket being the surfaces whereby the first bracket and the second bracket interface with one another when in an assembled configuration, forming a downward configured U-shaped structure, each bracket, composing a substantially symmetrical half of the U-shaped structure, whereby the horizontal and vertical plate of the first bracket are mirrored in relation to the horizontal and vertical plate of the second bracket;

the vertical plates of each bracket further comprising a plurality of slots; and the first end and the second end of the receiver plate fitting within one of the slots of the first bracket and second bracket, respectively.

2. The hitch lock as claimed in claim 1, wherein:
the plurality of slots are evenly spaced slots along the vertical plate of the first bracket and the vertical plate of the second bracket, wherein each slot is parallel to one another along the respective vertical bracket; and
the plurality of slots is located proximate a bottom portion of the vertical plate of the first bracket and the vertical plate of the second bracket, wherein at least one slot of the plurality of slots on the first bracket is collinearly aligned to at least one slot of the plurality of slots on the second bracket when in the assembled configuration.

3. The hitch lock as claimed in claim 2, wherein the horizontal portion of the receiver plate comprises a top surface, a bottom surface, and a through hole;
the receiver plate engaging with a hitch receiver tongue of a hitch assembly;
the bottom surface of the receiver plate facing downwardly;
the through hole of the receiver plate receiving a hitch ball shaft of a hitch assembly; and
the top surface of the receiver plate, positioned facing upwardly.

4. The hitch lock, as claimed in claim 2, wherein the second end of the receiver plate is angled downward thus providing a first angled end and a second angled end.

5. The hitch lock as claimed in claim 1, wherein the exterior surface of the horizontal plate of the first bracket comprises a hasp comprising a through hole proximate the mating face of the first bracket.

6. The hitch lock as claimed in claim 5, wherein the exterior surface of the horizontal plate of the second bracket comprises a hasp comprising a through hole proximate the mating face of the second bracket;
the hasp of the first bracket aligning with the hasp of the second bracket.

7. The hitch lock as claimed in claim 6, wherein the first bracket comprises a lock housing surrounding at least a portion of the hasp of the first bracket; and
the second bracket comprising a lock housing surrounding at least a portion of the hasp of the second bracket.

8. A hitch lock comprising:
a first bracket;
a second bracket; and
a receiver plate;
the first bracket and the second bracket are an L-shaped bracket;
the first bracket comprising a horizontal plate perpendicularly joined to a vertical plate extending downwardly from said horizontal plate;
the first bracket further comprising an interior surface and an exterior surface, wherein the exterior surface is the outwardly facing surface of the first bracket and the interior surface is the opposing surface of the first bracket;
the second bracket comprising a horizontal plate perpendicularly joined to a vertical plate extending downwardly from said horizontal plate;
the second bracket further comprising an interior surface and an exterior surface, wherein the exterior surface is the outwardly facing surface of the second bracket and the interior surface is the opposing surface of the second bracket;
the horizontal plate of the first bracket comprises a mating face;
the horizontal plate of the second bracket comprises a mating face;
the mating face of the first bracket and the mating face of the second bracket being the surfaces whereby the first bracket and the second bracket interface with one another when in an assembled configuration, forming a downward configured U-shaped structure, each bracket, composing a substantially symmetrical half of the U-shaped structure, whereby the horizontal and vertical plate of the first bracket are mirrored in relation to the horizontal and vertical plate of the second bracket;
the vertical plate of the first bracket and the vertical plate of the second bracket each comprise a plurality of slots;
the plurality of slots are evenly spaced slots along the vertical plate of the first bracket and the vertical plate of the second bracket, wherein each slot is parallel to one another along the respective vertical bracket;
the plurality of slots is located proximate a bottom portion of the vertical plate of the first bracket and the vertical plate of the second bracket, wherein at least one slot of the plurality of slots on the first bracket is collinearly aligned to at least one slot of the plurality of slots on the second bracket when in the assembled configuration;
the receiver plate comprising a rectangular plate comprising a horizontal portion with two ends, a first end, and a second end;
the first end being angled downward, thus providing a first angled end;
the first end of the receiver plate fitting within one of the slots of the vertical plate of the first bracket;
the second end of the receiver plate fitting within the corresponding aligned slot of the second bracket; and
the receiver plate comprising a through hole positioned approximately centered on the receiver plate.

9. The hitch lock as claimed in claim 8 wherein the through hole of the receiver plate receives a hitch ball shaft of a hitch assembly.

10. The hitch lock, as claimed in claim 8, wherein the second end of the receiver plate is angled downward thus providing a second angled end.

11. The hitch lock as claimed in claim 8, wherein the horizontal portion of the receiver plate comprises a top surface and a bottom surface;
the receiver plate engaging with a hitch receiver tongue of a hitch assembly;
the bottom surface of the receiver plate opposing the top surface, facing downwardly; and
the top surface of the receiver plate, positioned facing upwardly.

12. The hitch lock as claimed in claim 11, wherein the exterior surface of the horizontal plate of the first bracket comprises a hasp comprising a through hole proximate the mating face of the first bracket.

13. The hitch lock as claimed in claim 12, wherein the exterior surface of the horizontal plate of the second bracket comprises a hasp comprising a through hole proximate the mating face of the second bracket.

14. The hitch lock as claimed in claim 13, wherein the through hole of the hasp of the first bracket is coaxially aligned with the through hole of the hasp of the second bracket.

15. The hitch lock as claimed in claim 14, wherein the first bracket comprises a lock housing surrounding at least a portion of the hasp of the first bracket; and
the second bracket comprising a lock housing surrounding at least a portion of the hasp of the second bracket.

16. A hitch lock comprising a first bracket and a receiver plate wherein said first bracket is an L-shaped bracket;

the first bracket comprising a horizontal plate perpendicularly joined to a vertical plate extending downwardly from said horizontal plate;

the first bracket further comprising an interior surface and an exterior surface, wherein the exterior surface is the outwardly facing surface of the first bracket and the interior surface is the opposing surface of the first bracket;

the horizontal plate of the first bracket comprises a mating face;

the vertical plate of the first bracket comprising a plurality of slots;

the plurality of slots are evenly spaced slots along the vertical plate of the first bracket proximate a bottom portion of the vertical plate;

the exterior surface of the horizontal plate of the first bracket comprises a hasp comprising a through hole proximate the mating face of the first bracket;

the first bracket comprising a lock housing surrounding at least a portion of the hasp of the first bracket;

the receiver plate being a rectangular plate comprising a horizontal portion and a first end;

the first end of the receiver plate fitting within one of the slots of the vertical plate of the first bracket;

the horizontal portion of the receiver plate comprises a top surface, a bottom surface, and a through hole;

the receiver plate engaging with a hitch receiver tongue of a hitch assembly;

the through hole of the receiver plate receiving a hitch ball shaft of a hitch assembly;

the top surface of the receiver plate, positioned facing upwardly, opposing the bottom surface; and the first of the receiver plate is angled downward thus providing a first angled end.

17. The hitch lock as claimed in claim 16, further comprising a second bracket wherein said second bracket is an L-shaped bracket;

the second bracket comprising a horizontal plate perpendicularly joined to a vertical plate extending downwardly from said horizontal plate;

the second bracket further comprising an interior surface and an exterior surface, wherein the exterior surface is the outwardly facing surface of the second bracket and the interior surface is the opposing surface of the second bracket;

the horizontal plate of the second bracket comprises a mating face;

the mating face of the first bracket and the mating face of the second bracket being the surfaces whereby the first bracket and the second bracket interface with one another when in an assembled configuration, forming a downward configured U-shaped structure, each bracket, the first bracket and the second bracket, composing a substantially symmetrical half of the U-shaped structure, whereby the horizontal and vertical plate of the first bracket are mirrored in relation to the horizontal and vertical plate of second bracket;

the vertical plate of the second bracket comprising a plurality of slots;

the plurality of slots are evenly spaced slots along the vertical plate of the second bracket proximate a bottom portion of the vertical plate, wherein each slot is parallel to one another along said second bracket;

the plurality of slots is located proximate a bottom portion of the vertical plate of the first bracket and the vertical plate of the second bracket, wherein at least one slot of the plurality of slots on the first bracket is collinearly aligned to at least one slot of the plurality of slots on the second bracket when in the assembled configuration;

the exterior surface of the horizontal plate of the second bracket comprises a hasp comprising a through hole proximate the mating face of the second bracket wherein the through hole of the hasp of the first bracket is coaxially aligned to the through hole of the hasp of the second bracket; and the second bracket comprising a lock housing surrounding at least a portion of the hasp of the first bracket.

18. The hitch lock as claimed in claim 17, wherein the receiver plate further comprises a second end;

the second end of the receiver plate fitting within the corresponding aligned slot of the second bracket;

the second end of the receiver plate is angled downward thus providing a second angled end.

* * * * *